US008468099B2

(12) United States Patent
Headings et al.

(10) Patent No.: US 8,468,099 B2
(45) Date of Patent: Jun. 18, 2013

(54) DIGITAL ENTERTAINMENT SERVICE PLATFORM

(75) Inventors: Kevin P. Headings, Pacific Palisades, CA (US); Steven M. Schein, Chino Hills, CA (US)

(73) Assignee: Intertainer, Inc., Los Angeles, CA (US)

( * ) Notice: Subject to any disclaimer, the term of this patent is extended or adjusted under 35 U.S.C. 154(b) by 0 days.

(21) Appl. No.: 12/587,667

(22) Filed: Oct. 10, 2009

(65) Prior Publication Data

US 2010/0036724 A1    Feb. 11, 2010

Related U.S. Application Data

(63) Continuation of application No. 11/189,608, filed on Jul. 26, 2005, now abandoned, which is a continuation of application No. 09/947,592, filed on Sep. 5, 2001, now Pat. No. 6,925,469.

(60) Provisional application No. 60/280,653, filed on Mar. 30, 2001.

(51) Int. Cl.
  *G06Q 30/06*    (2012.01)
(52) U.S. Cl.
  USPC .............................................. 705/59; 725/35
(58) Field of Classification Search
  USPC ...................................................... 705/26, 51
  See application file for complete search history.

(56) References Cited

U.S. PATENT DOCUMENTS 5,027,400 A   6/1991 Baji
5,191,573 A   3/1993 Hair (Continued)

FOREIGN PATENT DOCUMENTS

EP    0 840 241 A1    5/1998
EP    1 016 990 A2    7/2000

(Continued)

OTHER PUBLICATIONS

Apple Inc., Google Inc., and Napster Inc.'s Invalidity Contentions, from *Intertainer, Inc.* v. *Apple Computer, Inc., Google Inc., and Napster Inc.*, In the United States District Court for the Eastern District of Texas Marshall Division, Civil Action No. 2-06CV-549 TJW; Oct. 9, 2007; pp. 1-22; Appendix 1, pp. 1-11; Appendix 2, pp. 1-14; Appendix 3, pp. 1-14; Appendix 4, pp. 1-13; Appendix 5, pp. 1-10; Appendix 6, pp. 1-11; Appendix 7, pp. 1-12; Appendix 8, pp. 1-16; Appendix 9, pp. 1-18; Appendix 10, pp. 1-12; Appendix 11, pp. 1-12; Appendix 12, pp. 1-11; Appendix 13, pp. 1-10; Appendix 14, pp. 1-13; Appendix 15, pp. 1-11; Appendix 16, pp. 1-8; Appendix 17, pp. 1-10; Appendix 18, pp. 1-7; Appendix 19, pp. 1-8; Appendix 20, pp. 1-12; Appendix 21, pp. 1-8; Appendix 22, pp. 1-6; Appendix 23, pp. 1-7; Appendix 24, pp. 1-11; Appendix 25, pp. 1-8; Appendix 26, (Continued)

*Primary Examiner* — Kuen S Lu
*Assistant Examiner* — Christopher J Raab
(74) *Attorney, Agent, or Firm* — Martin & Ferraro, LLP

(57) ABSTRACT

The present invention is directed to an open business platform that provides an end-to-end solution for managing, distributing, and/or retailing digital media assets from various content suppliers. In one or more embodiments, the present invention provides an integrated system that permits media content suppliers to deposit their media assets with the system where they are prepared by a content management system for distribution to consumers via a secure distribution system. The media content suppliers may then track and control the use of their media assets through a subscriber management system for managing consumer accounts, a licensing server for issuing licenses restricting the use of media content, and a royalty reporter for determining and reporting royalties to the various content suppliers.

18 Claims, 5 Drawing Sheets

U.S. PATENT DOCUMENTS

| | | | |
|---|---|---|---|
| 5,235,680 A | 8/1993 | Bijnagte |
| 5,253,275 A | 10/1993 | Yurt |
| 5,289,371 A | 2/1994 | Abel et al. |
| 5,307,495 A | 4/1994 | Seino et al. |
| 5,347,632 A | 9/1994 | Filepp et al. |
| 5,371,532 A | 12/1994 | Gelman |
| 5,408,630 A | 4/1995 | Moss |
| 5,446,919 A | 8/1995 | Wilkins |
| 5,539,450 A | 7/1996 | Handelman |
| 5,539,735 A | 7/1996 | Moskowitz |
| 5,539,871 A | 7/1996 | Gibson |
| 5,553,281 A | 9/1996 | Brown et al. |
| 5,557,541 A | 9/1996 | Schulhof et al. |
| 5,576,951 A | 11/1996 | Lockwood |
| 5,584,025 A | 12/1996 | Keithley et al. |
| 5,616,876 A | 4/1997 | Cluts |
| 5,636,346 A | 6/1997 | Saxe |
| 5,652,615 A | 7/1997 | Bryant et al. |
| 5,696,965 A | 12/1997 | Dedrick |
| 5,706,448 A | 1/1998 | Blades |
| 5,708,845 A | 1/1998 | Wistendahl et al. |
| 5,710,884 A | 1/1998 | Dedrick |
| 5,710,887 A | 1/1998 | Chelliah et al. |
| 5,717,923 A | 2/1998 | Dedrick |
| 5,724,521 A | 3/1998 | Dedrick |
| 5,729,594 A | 3/1998 | Klingman |
| 5,734,961 A | 3/1998 | Castille |
| 5,745,710 A | 4/1998 | Clanton et al. |
| 5,752,238 A | 5/1998 | Dedrick |
| 5,754,787 A | 5/1998 | Dedrick |
| 5,754,938 A | 5/1998 | Herz et al. |
| 5,758,257 A | 5/1998 | Herz et al. |
| 5,761,662 A | 6/1998 | Dasan |
| 5,765,152 A | 6/1998 | Erickson |
| 5,767,845 A | 6/1998 | Oashi et al. |
| 5,781,228 A | 7/1998 | Sposato |
| 5,790,423 A | 8/1998 | Lau et al. |
| 5,790,426 A | 8/1998 | Robinson |
| 5,790,935 A | 8/1998 | Payton |
| 5,802,518 A | 9/1998 | Karaev |
| 5,805,154 A | 9/1998 | Brown |
| 5,815,665 A | 9/1998 | Teper et al. |
| 5,818,935 A | 10/1998 | Maa |
| 5,819,271 A | 10/1998 | Mahoney |
| 5,825,876 A | 10/1998 | Peterson, Jr. |
| 5,826,243 A | 10/1998 | Musmanno et al. |
| 5,835,087 A | 11/1998 | Herz et al. |
| 5,848,396 A | 12/1998 | Gerace |
| 5,855,008 A | 12/1998 | Goldhaber et al. |
| 5,864,823 A | 1/1999 | Levitan |
| 5,864,871 A | 1/1999 | Kitain et al. |
| 5,881,131 A | 3/1999 | Farris et al. |
| 5,890,152 A | 3/1999 | Rapaport et al. |
| 5,892,508 A | 4/1999 | Howe |
| 5,892,900 A | 4/1999 | Ginter et al. |
| 5,894,589 A | 4/1999 | Reber et al. |
| 5,910,987 A | 6/1999 | Ginter |
| 5,918,012 A | 6/1999 | Astiz et al. |
| 5,918,014 A | 6/1999 | Robinson |
| 5,926,624 A | 7/1999 | Katz |
| 5,929,849 A | 7/1999 | Kikinis |
| 5,933,811 A | 8/1999 | Angles et al. |
| 5,953,710 A | 9/1999 | Fleming |
| 5,956,693 A | 9/1999 | Geerlings |
| 5,956,700 A | 9/1999 | Landry |
| 5,956,716 A | 9/1999 | Kenner et al. |
| 5,960,411 A | 9/1999 | Hartman et al. |
| 5,966,440 A | 10/1999 | Hair |
| 5,973,683 A | 10/1999 | Cragun et al. |
| 5,974,396 A | 10/1999 | Anderson et al. |
| 5,987,509 A | 11/1999 | Portuesi |
| 6,006,265 A | 12/1999 | Rangan et al. |
| 6,009,407 A | 12/1999 | Garg |
| 6,011,537 A | 1/2000 | Slotznick |
| 6,018,768 A | 1/2000 | Ullman et al. |
| 6,026,369 A | 2/2000 | Capek |
| 6,029,045 A | 2/2000 | Picco et al. |
| 6,047,296 A | 4/2000 | Wilmott et al. |
| 6,052,554 A | 4/2000 | Hendricks et al. |
| 6,058,424 A | 5/2000 | Dixon et al. |
| 6,065,042 A | 5/2000 | Reimer et al. |
| 6,065,058 A | 5/2000 | Hailpern et al. |
| 6,094,677 A | 7/2000 | Capek et al. |
| 6,134,593 A | 10/2000 | Alexander et al. |
| 6,154,738 A | 11/2000 | Call |
| 6,154,771 A | 11/2000 | Rangan et al. |
| 6,157,929 A | 12/2000 | Zamiska et al. |
| 6,163,272 A | 12/2000 | Goode et al. |
| 6,163,795 A | 12/2000 | Kikinis |
| 6,166,730 A | 12/2000 | Goode et al. |
| 6,169,573 B1 | 1/2001 | Sampath-Kumar et al. |
| 6,175,840 B1 | 1/2001 | Chen et al. |
| 6,178,407 B1 | 1/2001 | Lotvin et al. |
| 6,184,878 B1 | 2/2001 | Alonso et al. |
| 6,185,541 B1 | 2/2001 | Scroggie et al. |
| 6,189,008 B1 | 2/2001 | Easty et al. |
| 6,199,082 B1 | 3/2001 | Ferrel et al. |
| 6,202,056 B1 | 3/2001 | Nuttall |
| 6,205,432 B1 | 3/2001 | Gabbard et al. |
| 6,226,618 B1 | 5/2001 | Downs et al. |
| 6,229,895 B1 | 5/2001 | Son et al. |
| 6,236,975 B1 | 5/2001 | Boe et al. |
| 6,237,022 B1 | 5/2001 | Bruck et al. |
| 6,243,725 B1 | 6/2001 | Hempleman et al. |
| 6,247,130 B1 | 6/2001 | Fritsch |
| 6,269,275 B1 | 7/2001 | Slade |
| 6,269,394 B1 | 7/2001 | Kenner |
| 6,292,785 B1 | 9/2001 | McEvoy et al. |
| 6,292,797 B1 | 9/2001 | Tuzhilin et al. |
| 6,314,451 B1 | 11/2001 | Landsman et al. |
| 6,317,780 B1 | 11/2001 | Cohn et al. |
| 6,334,116 B1 | 12/2001 | Ganesan et al. |
| 6,337,901 B1 | 1/2002 | Rome et al. |
| 6,338,044 B1 | 1/2002 | Cook et al. |
| 6,338,094 B1 | 1/2002 | Scott et al. |
| 6,345,256 B1 | 2/2002 | Milsted |
| 6,349,410 B1 | 2/2002 | Lortz |
| 6,381,747 B1 | 4/2002 | Wonfor et al. |
| 6,385,596 B1 * | 5/2002 | Wiser et al. .................. 705/51 |
| 6,389,403 B1 | 5/2002 | Dorak, Jr. |
| 6,418,421 B1 | 7/2002 | Hurtado |
| 6,424,998 B2 | 7/2002 | Hunter |
| 6,457,010 B1 | 9/2002 | Eldering et al. |
| 6,462,754 B1 | 10/2002 | Chakraborty et al. |
| 6,483,986 B1 | 11/2002 | Krapf |
| 6,490,587 B2 | 12/2002 | Easty et al. |
| 6,496,802 B1 | 12/2002 | Van Zoest |
| 6,496,981 B1 | 12/2002 | Wistendahl et al. |
| 6,526,438 B1 | 2/2003 | Bienvenu et al. |
| 6,535,856 B1 | 3/2003 | Tal |
| 6,570,587 B1 | 5/2003 | Efrat et al. |
| 6,572,662 B2 | 6/2003 | Manohar et al. |
| 6,574,424 B1 | 6/2003 | Dimitri et al. |
| 6,604,224 B1 | 8/2003 | Armstrong et al. |
| 6,615,251 B1 | 9/2003 | Klug et al. |
| 6,628,302 B2 | 9/2003 | White et al. |
| 6,636,237 B1 | 10/2003 | Murray et al. |
| 6,637,032 B1 | 10/2003 | Feinleib |
| 6,640,145 B2 | 10/2003 | Hoffberg et al. |
| 6,650,640 B1 | 11/2003 | Muller et al. |
| 6,718,551 B1 | 4/2004 | Swix et al. |
| 6,763,345 B1 | 7/2004 | Hempleman et al. |
| 6,775,655 B1 | 8/2004 | Peinado et al. |
| 6,799,165 B1 | 9/2004 | Boesjes |
| 6,801,576 B1 | 10/2004 | Haldeman et al. |
| 6,810,527 B1 | 10/2004 | Conrad |
| 6,845,485 B1 | 1/2005 | Shastri et al. |
| 6,853,728 B1 | 2/2005 | Kahn et al. |
| 6,925,469 B2 | 8/2005 | Headings et al. |
| 6,944,585 B1 | 9/2005 | Pawson |
| 6,959,288 B1 | 10/2005 | Medina |
| 6,973,669 B2 | 12/2005 | Daniels |
| 6,986,156 B1 | 1/2006 | Rodriguez et al. |
| 7,010,801 B1 | 3/2006 | Jerding et al. |
| 7,017,173 B1 | 3/2006 | Armstrong et al. |
| 7,017,188 B1 | 3/2006 | Schmeidler et al. |
| 7,069,249 B2 | 6/2006 | Stolfo et al. |

| | | | |
|---|---|---|---|
| 7,089,579 B1 | 8/2006 | Mao et al. | |
| 7,099,847 B2 | 8/2006 | Darling | |
| 7,103,905 B2 | 9/2006 | Novak | |
| 7,103,906 B1 | 9/2006 | Katz et al. | |
| 7,139,813 B1 | 11/2006 | Wallenius | |
| 7,203,758 B2 | 4/2007 | Cook et al. | |
| 7,207,006 B1 | 4/2007 | Feig et al. | |
| 7,254,622 B2 | 8/2007 | Nomura et al. | |
| 7,275,254 B1 | 9/2007 | Jutzi | |
| 7,325,245 B1 | 1/2008 | Clapper | |
| 7,343,614 B1 | 3/2008 | Hendricks et al. | |
| 7,395,545 B2 | 7/2008 | Wonfor et al. | |
| 7,483,871 B2 | 1/2009 | Herz | |
| 7,661,117 B2 | 2/2010 | Markel | |
| 7,870,592 B2 | 1/2011 | Hudson et al. | |
| 8,175,921 B1 | 5/2012 | Kopra | |
| 2001/0003214 A1 | 6/2001 | Shastri et al. | |
| 2001/0025255 A1 | 9/2001 | Gaudian | |
| 2001/0033296 A1 | 10/2001 | Fullerton et al. | |
| 2001/0042043 A1 | 11/2001 | Shear et al. | |
| 2002/0007493 A1 | 1/2002 | Butler et al. | |
| 2002/0016736 A1 | 2/2002 | Cannon et al. | |
| 2002/0056118 A1 | 5/2002 | Hunter et al. | |
| 2002/0059574 A1 | 5/2002 | Tudor et al. | |
| 2002/0062393 A1 | 5/2002 | Borger et al. | |
| 2002/0065715 A1 | 5/2002 | Tennyson et al. | |
| 2002/0072997 A1 | 6/2002 | Colson et al. | |
| 2002/0083006 A1 | 6/2002 | Headings et al. | |
| 2002/0085024 A1 | 7/2002 | White et al. | |
| 2002/0087976 A1* | 7/2002 | Kaplan et al. | 725/34 |
| 2002/0095606 A1 | 7/2002 | Carlton | |
| 2002/0112235 A1 | 8/2002 | Ballou et al. | |
| 2002/0120564 A1 | 8/2002 | Strietzel | |
| 2002/0143647 A1 | 10/2002 | Headings et al. | |
| 2002/0143782 A1 | 10/2002 | Headings et al. | |
| 2002/0144283 A1 | 10/2002 | Headings et al. | |
| 2002/0184255 A1 | 12/2002 | Edd et al. | |
| 2003/0014328 A1 | 1/2003 | Lindner | |
| 2003/0120549 A1 | 6/2003 | Lindner | |
| 2003/0120557 A1 | 6/2003 | Evans et al. | |
| 2003/0126033 A1 | 7/2003 | Evans et al. | |
| 2003/0191816 A1 | 10/2003 | Landress et al. | |
| 2005/0262024 A1 | 11/2005 | Headings et al. | |
| 2009/0138925 A1 | 5/2009 | Headings et al. | |
| 2009/0138964 A1 | 5/2009 | Headings et al. | |
| 2009/0144154 A1 | 6/2009 | Schein | |
| 2009/0150219 A1 | 6/2009 | Headings et al. | |
| 2011/0107385 A1 | 5/2011 | Hudson et al. | |
| 2012/0254932 A1 | 10/2012 | Hudson et al. | |

FOREIGN PATENT DOCUMENTS

| | | |
|---|---|---|
| EP | 1 037 419 A2 | 9/2000 |
| JP | 11-316579 | 11/1999 |
| WO | WO 99/10822 A1 | 3/1999 |
| WO | WO 00/02143 A1 | 1/2000 |
| WO | WO 01/27773 A1 | 4/2001 |
| WO | WO 01/61592 A1 | 8/2001 |

OTHER PUBLICATIONS pp. 1-7; Appendix 27, pp. 1-7; Appendix 28, pp. 1-12; Appendix 29, pp. 1-7; Appendix 30, pp. 1-17; Appendix 31, pp. 1-17; Appendix 32, pp. 1-16; Appendix 33, pp. 1-10; Appendix 34, pp. 1-11; Appendix 35, pp. 1-10; Appendix 36, pp. 1-11; Appendix 37, pp. 1-17; Appendix 38, pp. 1-11; Appendix 39, pp. 1-19; Appendix 40, pp. 1-16; Appendix 41, pp. 1-29; Appendix 42, pp. 1-6; Appendix 43, pp. 1-12; Appendix 44, pp. 1-7; Appendix 45, pp. 1-9; Appendix 46, pp. 1-6; Appendix 47, pp. 1-6; Appendix 48, pp. 1-8; Appendix 49, pp. 1-10; Appendix 50, pp. 1-7; Appendix 51, pp. 1-7; Appendix 52, pp. 1-7; Appendix 53, pp. 1-7; Appendix 54, pp. 1-7; Appendix 55, pp. 1-10; Appendix 56, pp. 1-8; Appendix 57, pp. 1-9; Appendix 58, pp. 1-8; Appendix 59, pp. 1-9; Appendix 60, pp. 1-11; Appendix 61, pp. 1-10; Appendix 62, pp. 1-11; Appendix 63, pp. 1-10; Appendix 64, pp. 1-9; Appendix 65, pp. 1-11; Appendix 66, pp. 1-10; Appendix 67, pp. 1-10; Appendix 68, pp. 1-10; Appendix 69, pp. 1-8; Appendix 70, pp. 1-10; Appendix 71, pp. 1-6; Appendix 72, pp. 1-7; Appendix 73, pp. 1-7; Appendix 74, pp. 1-10; Appendix 75, pp. 1-7; Appendix 76, pp. 1-10; Appendix 77, pp. 1-10; Appendix 78, pp. 1-9; Appendix 79, pp. 1-11; Appendix 80, pp. 1-8; Appendix 81, pp. 1-10; Appendix 82, pp. 1-11; Appendix 83, pp. 1-9; Appendix 84, pp. 1-9; Appendix 85, pp. 1-9; Appendix 86, pp. 1-7; Appendix 87, pp. 1-7; Appendix 88, pp. 1-7; Appendix 89, pp. 1-7; Appendix 90, pp. 1-7; Appendix 91, pp. 1-7; Appendix 92, pp. 1-10; Appendix 93, pp. 1-7; Appendix 94, pp. 1-9; Appendix 95, pp. 1-7; Appendix 96, pp. 1-11; Appendix 97, pp. 1-11; Appendix 98, pp. 1-9; Appendix 99, pp. 1-7; Appendix 100, pp. 1-8; Appendix 101, pp. 1-8; Appendix 102, pp. 1-8; Appendix 103, pp. 1-7; Appendix 104, pp. 1-10; Appendix 105, pp. 1-9; Appendix 106, pp. 1-8; Appendix 107, pp. 1-8; Appendix 108, pp. 1-7; Appendix 109, pp. 1-9.

"Dig-Music: An On Demand Digital Musical Selection System Utilizing CATV Facilities," IEEE Transactions on Consumer Electronics, vol. CE-28, Issue 3, pp. xviii-xxvi (Aug. 1982).

"Final Report: Digital Audio Visual Work Trading by ATM—ATMAN," obtained from ftp://ftp.cordis.europa.eu/pub/infowin/docs/fr-225.pdf (Sep. 1, 1996).

"Liquid Audio: Products & Services," http://web.archive.org/web/20000302001521/www.liquidaudio.com/services/anl/anl.html (and linked pages), stored on archive.org on Mar. 2, 2000.

A.J.S. Ball, G.V. Bochmann and Jan Gecsei, "Videotex Networks," IEEE Computer, vol. 13, Issue 12, Dec. 1980, pp. 8-14.

C. Federighi and L.A. Rowe, "A Distributed Hierarchical Storage Manager for a Video-on-Demand System," Proc. of IS&T/SPIE 1994 Int'l Symp. on Elec. Imaging: Science and Technology, San Jose, CA, Feb. 1994. Also appears in Storage and Retrieval for Image and Video Databases II, The International Society for Optical Engineering, vol. 2185, pp. 185-197, 1994.

C. Fenger and M. Elwood-Smith, "The Fantastic Broadband Multimedia System: Software Platform Description" (v. 1.3), The Fantastic Corporation, May 19, 2000.

Diva Systems Corp. website (http://web.archive.org/web/19980509053455/divatv.com/onsetlayer2-3.htm), archived by web.archive.org in May 1998 (3 pages).

Diva Systems Corp., Form 10-K (Sep. 28, 1999). Available at http://www.sec.gov.

Earthnoise.com, archived by archive.org on various dates between Apr. 23, 2000 and May 11, 2003 (19 pages).

Frank J. Derfler, Jr. & Les Freed, *How Networks Work*, 4th Ed. Que Corporation (Macmillian Computer Publishing) (1998).

G. Caire, "ATMAN: Trading of Digital Audio Visual Contents," Multimedia Applications, Services and Techniques—ECMAST '98, David Hutchison, Ralf Schäfer (Eds.), 352-365, May 1998.

H. Jiang & A.K. Elmagarmid, "WVTDB—A Semantic Content-Based Video Database System on the World Wide Web," IEEE Transactions on Knowledge and Data Engineering, vol. 10, No. 6, Nov./Dec. 1998.

Hauglid et al., "WebSTAR—Video Database on WWW," IS&T/SPIE Conference on Multimedia Computing and Networking 2000, San Jose, California, Jan. 2000.

IMAKE.COM, as archived by archive.org, available at http://web.archive.org/web/19980110131456/www.imake.com/media/products/dbs.html, 1998.

Intertainer press release web page for 1998 (http//:www.intertainer.com/pr1998.html): press release dated Feb. 11, 1998, "Intertainer Unveils World's First Interactive Broadband Service for On-Demand Delivery of Full Motion Video-Based Entertainment" (http://www.intertainer.com/news/30.html).

Intertainer, www.intertainer.com, archived by web.archive.org on various dates between Feb. 21, 1999 and Jun. 21, 1999 (pp. 1-858).

J. Gecsei, *The Architecture of Videotex Systems*, Prentice-Hall, Inc. (1983).

Jeff Patterson & Ryan Melcher, Audio on the Web, Peachpit Press, 1998.

José Maria González, "The Berkeley Video on Demand System Implementation," May 22, 2000 (pp. 1-22).

L.A. Rowe, J. Boreczky, and C. Eads, "Indexes for User Access to Large Video Databases," Proc. of IS&T/SPIE 1994 Int'l Symp. on Elec. Imaging: Science and Technology, San Jose, CA, Feb. 1994.

Also appears in Storage and Retrieval for Image and Video Databases II, The International Society for Optical Engineering, vol. 2185, pp. 150-161, 1994.
Liquid Audio, Inc., Liquifier Pro User Manual Version 1.2, Jun. 1997.
Loudeye Corp., Form 10-K (Feb. 27, 2001), available at http://www.sec.gov.
M. Carrer et al., "An Annotation Engine for Supporting Video Database Population," Multimedia Tools and Applications, vol. 5, No. 3, Nov. 1997, pp. 233-258. (available at hulk.bu.edu/pubs/papers/1997/TR-08-15-96.pdf).
M. Re, "Business-to-Business Digital Video Mega-Stores," Advances in Information Technologies: The Business Challenge, J.-Y. Roger et al. (Eds.), (IOS Press 1998).
Michael Robertson & Ron Simpson, *The Official MP3.com Guide to MP3*, Sybil Sosin ed., MP3.com, Inc., 1999.
MP3.com—Artist Area FAQ, http://web.archive.org/web/20010605151513/studio.mp3.com/cgi-bin/artistadmin/support.cgi?step=FAQ, (Archived by web.archive.org on Jun. 5, 2001) (pp. 1-40).
MP3.com website (http://www.mp3.com) archived by web.archive.org in May 1999 at http://web.archive.org/web/19990508090942/www.mp3.com/Artist/artisffaq.php3 (69 pages).
P.W. Bagenal and S.M. Upton, "Customer Management and the Eurocypher Conditional Access System at British Satellite Broadcasting," British Satellite Broadcasting, UK, pp. 270-277, Sep. 21-25, 1990.
Preston Gralla, *How the Internet Works, Millenium eEdition*, Que Corporation (Macmillian Computer Publishing) (Aug. 1999).
Rod Underhill & Nat Gertler, *The Complete Idiot's Guide to MP3: Music on theInternet*, 2000.
Ron White, *How Computers Work, Millennium Ed.*, Que Corporation (Macmillian Computer Publishing) (Sep. 1999).
Shareyourworld.com Archived by archive.org in Feb./Mar. 2000 (pp. 1-2).
T. Horstmann & R. Bentley, "Distributed Authoring on the Web with the BSCW Shared Workspace System," StandardView, vol. 5, No. 1, Mar. 1997 (pp. 9-16).
Request for Inter Partes Reexamination for U.S. Patent No. 6,925,469 to Headings et al. Under 35 U.S.C. section 311 and 37 C.F.R. section 1.913.
The Office Action from prosecution of U.S. Patent No. 6,925,469 to Headings et al. dated May 7, 2004.
Amendment from prosecution of U.S. Patent No. 6,925,469 to Headings et al. dated Nov. 8, 2004.
Notice of Allowance from prosecution of U.S. Patent No. 6,925,469 to Headings et al. dated Mar. 22, 2005.
Alvear, ShareYourWorld and Make Money From Your Home Videos, StreamingMedia.com Research Center (Mar. 7, 2000), at http://wwwstreamingmedia.com/article.asp?id=5025&page=1 (pp. 1-2).
Wilson, In Brief, Time Magazine (Mar. 20, 2000), available at http://www.time.com/time/magazine/article/0,9171,996415,00.html (p. 1).
Shareyourworld.com Web Site Archive (2000), available at http://web.archive.org/web/20000229135009/http://www.shareyourworld.com/about.phtml (pp. 1-15).
The Office Action from prosecution of U.S. Appl. No. 11/189,608 to Headings et al. dated Sep. 27, 2007.
Wegener Announces MPEG-2 Based System for Broadcasters Using Micropolis Video Servers, Mar. 27, 1995.
"Buying Music over the Internet", R. Colombo, Liquid Audio White Paper, 1997.
Third Party Comments After Patent Owner's Response in Accordance with 37 C.F.R. 1.947 for Reexamination Control No. 95/000,313 dated May 14, 2008, 53 pages.
Intertainer, Inc., May 24, 1999 Press Release, "Big Entertainment's Bige.com Expands Distribution Reach on Intertainer's On-Demand Entertainment Broadband Network," available at http://www.intertainer.com/news/19.html, 2 pages.
Intertainer website, "Advertising Information," available at http://web.archive.org/webl20000229142855/www.intertainer.com/service/advertising.html, Feb. 2000, 1 page.
Little et al., "Prospects for Interactive Video-on-Demand," IEEE Multimedia, Fall 1994, 22 pages.

Milenkovic, "Delivering Interactive Services via a Digital TV Infrastructure," IEEE, Fall 1998, 10 pages.
Action Closing Prosecution for Reexamination Control No. 95/000,313 mailed Mar. 19, 2009, 66 pages.
Action Closing Prosecution for Reexamination Control No. 95/000,313 mailed May 21, 2010, 71 pages.
Microsoft Computer Dictionary, Fourth Edition, 1999, 2 cover pages and p. 468.
MP3.com Web Site Archive, from http//web.archive.org/web/19991013120103/http://www.mp3,com; Oct. 13, 1999 through Feb. 29, 2000 (27 pages).
Office Action in Inter Partes Reexamination for Reexamination Control No. 95/000,313 mailed Feb. 13, 2008, 53 pages.
Right of Appeal Notice for Reexamination Control No. 95/000,313 mailed Nov. 4, 2009, 67 pages.
Right of Appeal Notice for Reexamination Control No. 95/000,313 mailed Nov. 12, 2010, 76 pages.
Third Party Comments After Patent Owner's Proposed Amendment, in Accordance with 37 C.F.R. 1.951(b) for Reexamination Control No. 95/000,313 dated Jun. 16, 2009, 50 pages.
Third Party Comments in Response to Patent Owner's, Amendment and in Accordance with the Jan. 15, 2010 Petition Decision for Reexamination Control No. 95/000,313 dated Feb. 12, 2010, 53 pages.
Examiner's Answer for Reexamination Control No. 95/000,313 mailed Apr. 16, 2012, 5 pages.
*Intertainer, Inc.* v. *Hulu, LLC*, In the United States District Court for the Central District of California Southern Division, Defendant Hulu, LLC's Responses to Plaintiff Intertainer, Inc's First Set of Interrogatories, Case No. SACV 11-01208 CJC (RNBx) (Mar. 19, 2012).
*Intertainer, Inc.* v. *Hulu, LLC*, In the United States District Court for the Central District of California Southern Division, Defendant Hulu, LLC's First Supplemental Responses to Plaintiff Intertainer, Inc.'s Interrogatories Nos. 2 and 3, Case No. SACV 11-01208 CJC (RNBx) (Apr. 20, 2012).
Ackerman, D. et al. (Oct. 5, 1998). "Streaming Video Over the Internet," *Connect*, three pages.
Bargeron, David et al., Annotations for Streaming Video on the Web: System Design and Usage Studies (Elsevier Science B.V.) 11 pp. (Mar. 1999).
Bove, W. Michael et al., Adding Hyperlinks to Digital Television, PROC. 140th SMPTE Technical Conference 11 pp. (1998).
Buchanan, M. Cecelia et al, Specifying Temporal Behavior in Hypermedia Documents, ACM ECHT Conference 12 pp. (1992).
Bulterman, Dick C.A. et al., GRiNS. A Graphical Interface for creating an playing SMIL documents, Computer Networks and ISDN Systems 30, 14 pp. (1998).
Bulterman, Dick, C.A., Models, Media and Motion: Using the Web to Support Multimedia Documents, Multimedia Modeling 97, 20 pp. (Nov. 1997).
Caravello-Hibbert, Stephanie M., Teaching Non-Science Majors: Science Through Interactive Multi-Media, A Quarterly Devoted to Microcomputers in the Higher Eduction Curriculum, Vo. X, No. 2, pp. 97-102 (May 1992).
Cardillo, Darlene S., Using a Foreign Film to Improve Second Language Proficiency: Video Vs. Interactive Multimedia, J. Educational Technology Systems, Vo. 25(2), p. 169 (1996).
Chang, Edward Y., πDTV: A Client-Based Interactive DTV Architecture, Multimedia '99 4 pp. (1999).
Dakss, Jonathan et al., HyperActive: An Automated Tool for Creating Hyperlinked Video, MEDIA 1997 pp. 1-101 (Sep. 1999).
Dakss, Jonathan et al. Hyperlinked Video, Proc. SPIE, vol. 3528, 9 pp. (Nov. 1998).
Echiffre, Marica et al., MHEG-5—Aims, Concepts, and Implementation Issues, Journal IEEE Multimedia, vol. 5, No. 1, pp. 84-91 (Jan.-Mar. 1998).
Francisco-Revilla, Luis, A Picture of Hypervideo Today, 12 pp. (1998) at http:/www.csdl.tamu.edu/~10f0954/academic/cpsc610/p-1.htm.
Freeman, Mark et al., Seamless Video Expansion: Shaping the Contours of Streams for Personalized TV, ACM SIGCHI (Human Factors in Computer Systems) pp. 5-15 (2000).

Goldsworthy, Richard, Designing Instruction for Emotional Intelligence, Educational Technology, vol. 40, No. 5, pp. 43-48 (Sep.-Oct. 2000)

Hardman, Lynda et al., Hypermedia: The Link with Time, ACM Computing Surveys, vol. 31, No. 4ES. 5 pp. (Dec. 1999).

Hardman, Lynda et al., Links in Hypermedia: The Requirement for Context, Hypertest '93 Proceedings, pp. 183-191 (Nov. 1993).

Herrmann, L. (Oct. 1999). "MPEG-4 Interactive Services over IP," located at www.itu.int/TELECOM/wt99/cfp/auth/2697/pap_2697.doc, pp. 1-6.

Johnson, Judi Mathis, ed., Software Reviews, The Computing Teacher pp. 49-55 (Oct. 1994).

Lawton, George, Video Streams into the Mainstream, Computer, vol. 33, No. 7, pp. 12-17 (Jul. 2000).

Lewis, Paul A. et al., Media-based Navigation with Generic Links, Hypertext '96, pp. 215-223 (1996).

Ma, Wei-hsiu et al., Networked Hyper QuickTime: Video-Based Hypermedia Authoring and Delivery for Education-on-Demand, 19 pages (UMSI 99/52 Apr. 1999).

Ma, Wei-hsiu et al., Video-Based Hypermedia for Education-on-Demand, IEEE Multimedia, pp. 72-83, Jan.-Mar. 1998.

Makofske, David B. et al., From Broadcast Television to Internet Audio/Video: Techniques and Tools for VCR-Style Interactivity, 24 pp. (Oct. 1999).

Manolescu, Dragos-Anton et al., Link Management Framework for Hyper-media Documents. Proceedings IEEE International Conference on Multimedia Computing and Systems '97. Jun. 3-6, 1997, 8 pages.

Meyer, Thomas et al., A Taxonomy on Multimedia Synchronization, Proceedings of the Fourth Workshop on Fugure Trends of Distributed Computing Systems, Sep. 22-24, 1993, pp. 97-103.

Miller, Gene et al., News On-Demand for Multimedia Networks, Proc. ACM International Conference on Multimedia, Anaheim, California USA, Aug. 2-6, 1993 11 pp.

Pereira, F. et al. (1999). "MPEG-4—Opening New Frontiers to Broadcast Services," EBU Technical Review, pp. 1-14.

RealPlayer 8 Plus User Manual, 112 pp. (Aug. 2000), at http://service.real.com/help/player/plus_manual.8/rppmanual.htm.

RealSystem Production Guide, 200 pp. (Dec. 12, 2000), at http://service.real.com/help/library/guides/production8/realpgd.htm.

Rodriques, L.M. et al., Improving SMIL Documents with NCM Facilities, Multimedia Modeling '99, Oct. 4, 1999, 20 pp.

Rody, J.A. et al., A Remote Presentation Agent for Multimedia Databases, 1995 International Conference on Multimedia Computing and Systems (ICMCS'95) pp. 223-230 (1995).

Shea, Peter, Leveling the Playing Field: A Study of Captioned Interactive Video for Second Language Learning, Journal of Educational Computing Research, vol. 22, No. 3, pp. 243-263 (2000).

Smith, Jason McC. Et al., An Orthogonal Taxonomy for Hyperlink Anchor Generation in Video Streams using OvalTine, Hypertext '00 Proc. of the Eleventh ACM on Hypertext and Hypermedia, 8 pp. (2000).

Swan, Karen, Exploring the Role of Video in Enhancing Learning from Hypermedia, J. Educational Technology Systems, vol. 25(2), 1996, pp. 179-188.

Swinehart, Daniel C. et al., A Structural View of the Cedar Programming Environment, ACM Transactions on Programming Languages amd Systems, vol. 8, No. 4, pp. 419-490 (Oct. 1986).

Synchronized Mulimedia Integration Language (SMIL) 1.0 Specification, W3C Recommendation, Jun. 15, 1998, http://www.w3.org/TR/REC-smil/.

ten Kate, Warner et al., Presenting Multimedia on the Web and in TV Broadcast, 3rd European Conference on Multimedia Applications, Services, and Techniques 19 pp. (1998).

Viren, John et al., Distance Learning Over ATM/Sonet: The Distance Learning Environment Demonstration, J. of Education Technology Systems, vol. 27, No. 3, pp. 231-243 (1999).

Washisaka, Mitsukazu et al., Video/Text Linkage System Assisted by a Concept Dictionary and Image Recognition, Proceedings of the Third IEEE International Conference on Multimedia Computer and Systems '96, pp. 334-339, Jun. 1996.

* cited by examiner

DIGITAL ENTERTAINMENT SERVICE PLATFORM

RELATED APPLICATION

This application is a continuation of U.S. application Ser. No. 11/189,608, filed Jul. 26, 2005 now abandoned; which is a continuation of U.S. application Ser. No. 09/947,592, filed Sep. 5, 2001 now U.S. Pat. No. 6,925,469; which claims the benefit of U.S. Provisional Application No. 60/280,653, filed Mar. 30, 2001; all of which are incorporated by reference herein.

BACKGROUND

The digitization of media content (e.g., movies, music videos, educational content, television shows, live events, advertising, literary works, audio programs, and other media assets) is becoming more and more common with the advent of technology that allows content suppliers to derive revenues from these assets in a digital marketplace. There is a cost for entry into the digital space that requires infrastructure and processes to effectively manage and distribute various forms of media content, particularly over high bandwidth channels of communication (e.g., digital cable, Internet protocol, and satellite). Content suppliers are not traditionally equipped to handle these requirements. They would benefit from a platform and service offering that removes the barrier to entry into the digital marketplace.

There is also a problem on the content user side. For purposes hereof, a "content user" is any person or entity that sells or otherwise exploits media content. A content user may be, for example, the content supplier, a digital services platform operator, an online site builder, an educational institution, application service provider, or a retailer. One issue facing content users is that consumers want to enter online "malls" or stores that allow them to browse and purchase a wide variety of content choices. This presents unique challenges to content users wishing to develop and sell compelling digital services to these consumers. For example, consumers are used to contemporary brick and mortar stores that allow them to browse and purchase from a fully "aggregated" content offering (e.g., a record store). This offering is not content supplier specific; rather, it is grouped by genres and aisles that make sense to the consumer. In short, a consumer looking for music content does not browse the "Brand X" aisle looking for "Brand X" content offerings; instead they browse "New Releases" and "Rock." Consumers expect an aggregated content set. For purposes hereof, "consumers" are people who view, listen, or otherwise interact with the media content (e.g., people watching television).

This consumer expectation is a problem for online site builders, for example, in that an online site dedicated to the sale of movies or music must be content rich and diverse. It must attempt to emulate the brick and mortar equivalent that consumers use today. While many content owners are looking to build an online entertainment site that is branded and full of their content, such sites are fundamentally too abstract, segmented, and potentially uninteresting to online consumers.

In addition, many content suppliers are not skilled in the art of digitizing and managing content for diverse digital service platforms (e.g., cable set-top box and satellite platforms). Traditional brick and mortar establishments typically do not sell media content in digital form and have not dealt with issues such as encoding, encryption and license tracking. Other issues regarding media content distribution, such as streaming and digital downloading, also provide significant barriers to entry for content suppliers not adept at delivering media content electronically to the consumer.

Finally, the aggregation of compelling and diverse media content often requires licenses from numerous content suppliers who impose restrictions on the use of their media content. The ability to individually manage each media asset from each content supplier in accordance with their varying restrictions and requirements can also be a daunting task for many content users. In view of the foregoing, there is a need for a digital service platform that offers a wide variety of content to a consumer and provides an end-to-end solution for managing media content (including advertising and e-commerce), providing enhanced content-related services (e.g., digital rights management (DRM)), collecting consumer information (e.g., billing), and electronically delivering the content to a content user or consumer.

SUMMARY OF THE INVENTION

The present invention is directed to an open business platform that provides an end-to-end solution for managing, distributing, and/or retailing digital media assets from various content suppliers. Users of this business platform may include content suppliers and other content users. For purposes hereof, "content suppliers" may include entities that own the content, have rights to the content, or are otherwise suppliers of the content.

The present invention provides content suppliers with a digital service platform for remotely depositing its media assets, managing its media assets using business rules to control the distribution of and revenue generated from the media assets, and tracking consumer usage of its media assets to assist in consumer marketing decisions. Providers of digital services (such as multiple cable system operators (MSOs) or website operators; also referred to herein as "content users") seek to offer their customers a wide variety of compelling and diverse content. Because the present invention is an open platform designed to support multiple content suppliers, it allows consumers to access content in an aggregated manner similar to that of a traditional brick and mortar store. The present invention provides these content users with an integrated platform for managing and distributing such content to consumers. The present invention further enables the content user to offer consumers content choices grouped by understandable and desirable genres and categories. For example, the "New Releases" section of an online site could contain titles from all the major movie studios, not just a subset specific to one or two movie studios owning the content. Moreover, the present invention can support channels (e.g., Disney®, Discovery®) if the content user wishes to enable such groupings.

The features of the present invention may be divided into three functions: Digital Content Services, Platform Operation, and Digital Content Sales. Each of these three functions are discussed in detail below:

(1) Digital Content Services:

This is the "supply" side of the platform. Content suppliers look to maximize the return on their media assets and related data. In this context, media assets may include, for example, movies, music videos, television programs, video games, online books, live events, games, educational content, audio programs, or any other category of media assets. Related data may include, for example, content usage databases, merchandising databases, and content metadata.

In a preferred embodiment of the invention, content suppliers can submit a media asset and associated business rules into a safe and secure platform depository and receive periodic royalty payments on that asset in accordance with their business rules. "Business rules" define the parameters (e.g., geographic location, bit rate service, service provider, encryption, price, price range, method of delivery, and time frame available for offering the media content to consumers) for using a particular media asset. For example, business rules for a first-run movie may require the content user to sell the movie at a set price (e.g., $3.95), or a particular price range, or to encrypt the movie, or to digitize the movie at a specific bit rate, or to delivery the movie via streaming or digital downloading over a cable network, but not a DSL network.

(2) Platform Operation:

This is the operation and interface of the platform. From an operation perspective, the present invention includes interfaces that allow services provided by the platform to be tuned and maintained (e.g., video on demand (VOD) or ad targeting services). In another aspect, the present invention is a digital entertainment factory. Inputs (assets) into the platform may be combined in the same manner a factory combines raw materials in order to produce a consumer good. For example, a preferred embodiment of a content management system of the platform can combine merchandise databases with movie assets and an electronic commerce fulfillment system to create a new item or output. As used herein, an "item" includes one or more media assets and related metadata and/or other data. In this example, the item is a first-run movie with digital commerce opportunities embedded in the video stream and accessible by the consumer (e.g., using an intuitive point and click). The consumer can then purchase a "hard good" (e.g., a digital video disc (DVD) of the first-run movie) through a user interface of the platform, which includes an electronic commerce fulfillment system to ship the product to the consumer. The platform also preferably includes a subscriber management system for managing consumer accounts, a content distribution system for distributing media content to the consumers, a licensing server for issuing licenses restricting the use of media content, and a royalty reporter for determining and reporting royalties to one or more content suppliers.

(3) Digital Content Sales:

In order to be profitable and valuable to potential content suppliers and other content users, it is preferred that the platform support as many separate digital content clients (e.g., websites, set-top boxes) as possible. These clients can be owned and operated by any entity wanting to make digital content sales or otherwise distribute content directly to a consumer. In a preferred embodiment, one or more clients may be owned by a media content retailer.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

DESCRIPTION OF THE PREFERRED EMBODIMENTS

Reference will now be made in detail to the present preferred embodiments (exemplary embodiments) of the invention, examples of which are illustrated in the accompanying drawings.

Figure 1:
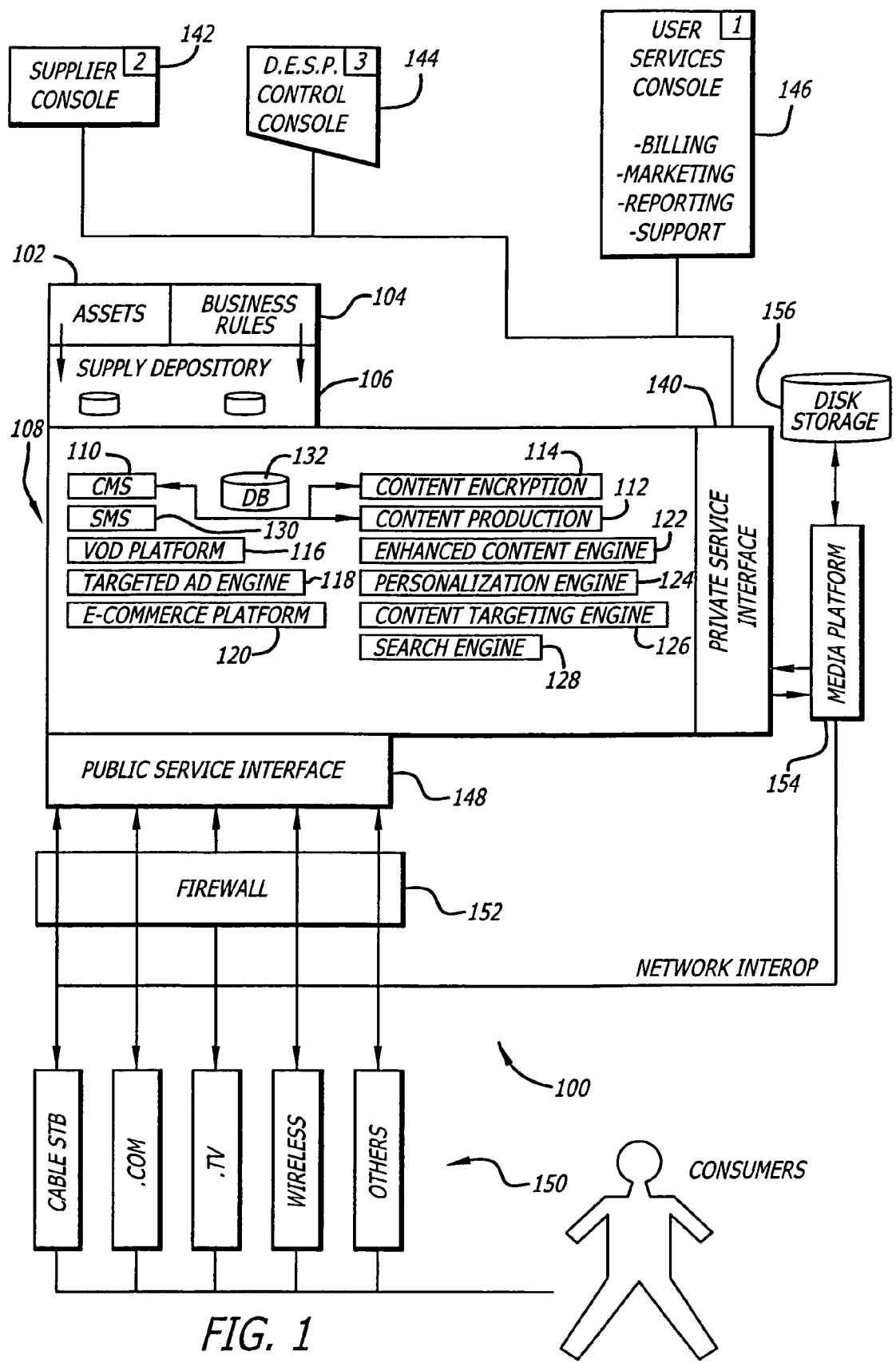
FIG. 1 is a schematic diagram of a preferred embodiment of the invention.

FIG. 1 shows a diagrammatic overview of a digital entertainment service platform (DESP) 100 in accordance with a preferred embodiment of the invention. DESP 100 includes three general functions: Digital Content Services, Platform Operation, and Digital Content Sales. The description of DESP 100 as set forth herein will make reference to each of these general functions.

The Digital Content Services function of DESP 100 generally includes receiving and archiving media assets from a content supplier. Specifically, the Digital Content Services function includes using media assets 102, which are provided by a content supplier to a content user and preferably stored in a supplier asset depository 106 on a service platform 108 (described in detail below). The content supplier may provide media assets 102 on contemporary and standard media sources, for example, Digital Betacam, digital linear tape (DLT), or VHS. Alternatively, the content supplier may deliver media assets 102 electronically using file transfer protocol methods or other known means of delivering digital data. Supplier asset depository 106 may include a vault or other physical storage area for housing "hard" copies of media assets 102 (e.g., VHS tape) or a data storage device (e.g., magnetic or optical disc storage devices) for storing "soft" copies of the media assets 102 (e.g., electronic data files).

The Digital Content Services function preferably includes use of a software-based application for creating and storing business rules 104, which govern how a particular media asset 102 is to be used. In a preferred embodiment, content suppliers can provide business rules for one or more media assets to the content user (e.g., platform operator) through an interface (e.g., website portal) connected to service platform 108. For example, the content user may construct an interface for the content suppliers with defined fields for entering information regarding each media asset or group of media assets. The defined fields may request the content supplier to enter the type of media being deposited (e.g., first-run movie), the service platform for distributing the media asset (e.g., cable and DSL platform), the level of encryption (e.g., low, medium or high), specific retailers for selling the media asset, and other parameters or information regarding use of the media asset. In addition, the content supplier may provide a content user with related data, which may also be stored along with media assets in supplier asset depository 106.

The content user may create other business rules governing the distribution, marketing, or other use of a media asset. For example, the platform operator may impose business rules on whether a particular media asset is enhanced for interactivity or combined with an electronic commerce fulfillment system (e.g., to sell merchandise related to the media asset). Finally, content users may also provide business rules to govern the distribution of content to particular clients.

The Platform Operation function of DESP 100 prepares media assets 102 and business rules 104 for distribution to clients and, preferably, includes use of service platform 108, a private service interface 140 for facilitating communication between service platform 108 and content users, a supplier console 142 for permitting content suppliers to access service platform 108, a DESP control console 144 for permitting the platform operator to access service platform 108, a user services console 146 for permitting content users to access service platform 108, and a public service interface 148 for facilitating communication between service platform 108 and a variety of client platforms.

Service platform 108 is preferably a server-based platform having a processor operable to perform a variety of functions such as receiving, storing, and preparing media assets 102 for distribution to consumers in accordance with business rules 104. In addition to media assets 102, business rules 104, and supplier asset depository 106, service platform 108 preferably includes a content management system 110, a content production application 112, a content encryption application 114, a VOD platform 116, a target advertising engine 118, an e-commerce platform 120, an enhanced content engine 122, a personalization engine 124, a content targeting engine 126, a search engine 128, a subscriber management system 130, and a database 132. A preferred example of a system architecture of a service platform operable with the present invention is taught in U.S. Application Serial No. (to be assigned), titled "Systems and Methods for Delivering Media Content," filed Aug. 7, 2001, which claims priority to U.S. Application Ser. No. 60/255,725, the disclosures of which are hereby incorporated by reference herein.

Content management 110 is a software-based application preferably run on service platform 108 and used to manage the preparation, programming, and distribution of media assets 102. Specifically, content management 110 automates the content management workflow, from receipt of media assets 102 and related data, through encoding, quality control, data entry and release of content to the field. Initially, media assets 102 are encoded (i.e., converted from analog to digital form) at one or more bit-rates, which may be specified by business rules 104.

Content production application 112 is a software-based application that may be utilized by content management system 110 to associate media assets 102 with, for example, metadata, related data, and retail information. Metadata may include such descriptive information like copyright information, titles, authors, and abstracts. In addition, content production application 112 may associate certain data with a media asset to create intelligent media. "Intelligent media" is content that includes coded information regarding the use of the content for tracking or targeting purposes. The data content production application 112 uses to create intelligent media may include license tracking information, which may be used to define a license period during which the content may be distributed by the content user; links to related content; associated "hard" goods for e-commerce; targeting information to target the media assets to a particular user demographic; advertising information to associate one or more advertisements with the media asset; and any other data which may be associated with a particular media asset. A preferred example of creating and using intelligent media may be found in U.S. patent application Ser. No. 09/605,695, titled "Intelligent Media Targeting System and Method," the disclosure of which is hereby incorporated by reference herein.

After content production 112, media assets 102 may be encrypted using a desired encryption process 114 (e.g., digital rights management) and stored in a designated location (e.g., supplier asset depository 106 or database 132). A single media asset 102 may be processed though content management multiple times to yield different forms of that media asset (e.g., the media may be encoded at multiple bit-rates and have different business rules). Accordingly, media assets, business rules, and related metadata are indexed and stored in content management system 110 or other designated area (e.g., database 132).

One preferred application of content management system 110 is the unique identification and naming of media assets, business rules, and related metadata, which are bundled to create an "item" and ultimately distributed by the content user. An item is created using an interface of content management system 110. The interface permits an operator to view and manipulate items within content management system 110. Another feature of content management system 110 is the classification and grouping of items into genres and channels commonly known by the content user (e.g., genre-movies; channel-comedy). In a preferred embodiment, these genres and channels may be offered to one or more content users by publishing the genres and channels and associated items to media services server 154. Alternatively, the genres and channels and associated items may be published directly to the content user (e.g., to MSO locations). The genres and channels may be updated periodically as specified by the platform operator (or content user). A preferred example of a content management system operable with the present invention is taught in U.S. application Ser. No. 09/921,100, titled "Content Management System," the disclosure of which is hereby incorporated by reference herein.

VOD Platform 116 is a software-based application that enables pay-per-view purchases of video content via, for example, streaming or digital downloading and provides full video cassette recorder (VCR) functionality (e.g., fast forward, rewind, pause, stop, and play). Targeted advertising engine 118 is a software-based application that enables targeting of advertisements based on specified criteria, including consumer demographics, time, geographic location and the user interface screen the consumer is currently viewing (or has viewed) on the entertainment service delivered over DESP 100. E-commerce platform 120 preferably delivers e-commerce as it relates to specific content or genre of content, enhancing the consumer's experience. For example, a consumer watching a music video can instantly select to purchase (e.g., using a mouse click) the related compact disc or other associated merchandise.

Enhanced content engine 122 enables full motion video interactivity to enhance viewing experience and prompt purchases. For example, an end user can click on an advertisement to interact with a brand, request more information about a service, or purchase the product instantly. A preferred example of enabling full motion interactivity may be found in U.S. application Ser. No. 09/921,097, titled "A System and Method for Interactive Video Content Programming," the disclosure of which is hereby incorporated by reference herein.

Personalization engine 124 is a software-based application that allows service platform 108 to personalize a consumer's experience based, for example, on that consumer's preferences or their interaction with the service. For example, using collaborative filtering, service platform 108 can recommend item choices that would be of interest to a consumer based on that consumer's demographics, purchasing habits, and other characteristics unique to that consumer. Content targeting engine 126 is a software-based application that allows targeted content to be "pushed" or delivered to content users as appropriate. Search engine 128 is a software-based application that enables searching of data stored on service platform 108.

Subscriber management system 130 is a software-based application that administers consumer or subscriber information and provides customer service and support with information and tools necessary to respond to questions or problems surrounding consumer purchases. In addition, subscriber management system 130 collects consumer usage information for reporting (e.g., to content suppliers or clients) and analysis. Subscriber management system 130 further provides user account management functionality. For example, consumers can typically set-up their user accounts online when they first register to use the entertainment service delivered by DESP 100. Subscriber management system 130 permits the consumers to access or modify their accounts online (e.g., to check their statement or update their address or credit card information) without any customer service intervention.

Subscriber management system 130 further supports credit card billing for purchases of content or hard goods by a consumer by capturing the consumer's credit card information and forwarding that information electronically to a credit card processing entity (e.g., a fulfillment partner or bank). A customer support group may also use subscriber management system 130 to manage customer service problems and generate customer service reports. Media content usage may be tracked by subscriber management system 130 to capture, for example, the type of content a consumer views or listens to, what hard goods the consumer buys, the number and type of advertisements the consumer has viewed or listened to, and how long the consumer uses the entertainment service per day or week. This information permits subscriber management system 130 to generate royalty reports for content suppliers.

A preferred service offered by the subscriber management system 130 is its ability to group consumers into service groups and publishing groups for targeted advertisement. A service group is defined as a grouping of consumers that receive services from the same service platform. Placement of a consumer in a service group may depend on parameters related to the distribution of the media asset and may include any one of or any combination of a client service platform for distributing the media asset (e.g., wireless, DSL, the Internet, satellite, or cable), encryption, specific retailers for selling or licensing the media asset(s), a geographical location, a level of service or bit rate, service provider, and a method of delivery (e.g., streaming or digital download). The grouping of consumers into service groups facilitates targeting media content having contractual obligations or business rules associated therewith. Each service provider, for example a client, may cater to a plurality of service groups and publication groups.

A publishing group is defined as a logical grouping of consumers that are related to a specific provider for the purpose of targeting media content. Different media content offerings can be targeted to different publishing groups concurrently, allowing for different sets of content to be available to each publishing group. For example, localized content, such as but not limited to news or sports features, can be presented to their local markets. Publishing groups may be used to group consumers into consumer groupings to perform further targeting such as localized, precision marketing. The targeted marketing may be directed to different geographically located consumers and/or, based on other consumer-related information such as any one of or a combination of demographics (e.g., gender, income and/or age), content usage (e.g., the amount of time the media content was viewed or listened to, consumer viewing or listening habits, and consumer preferences for different types or genres of media content), and parental controls. Content usage may be determined from analyzing data contained in a consumer research database, which may be located on service platform 108. Placement of a consumer in a particular publishing group will allow a client to specifically target a consumer based on the aforementioned characteristics. A preferred example of a subscriber management system operable with the present invention is taught in U.S. application Ser. No. 09/921,107, titled "Subscriber Management System," the disclosure of which is hereby incorporated by reference herein.

Service platform 108 preferably includes a private service interface 140 and a public service interface 148. Private service interface 140 is preferably a server-based interface to facilitate communication between service platform 108 and enterprise software applications used by the platform. Preferably, these applications are included on a supplier console 142, a DESP control console 144, and a user services console 146.

Supplier console 142 is preferably a software-based device (e.g., computer) that is operable to run an enterprise software application permitting a content supplier to remotely deposit its media assets, manage its media assets using business rules to control the distribution of and revenue generated from the media assets, and track consumer usage of its media assets to assist in consumer marketing decisions. Through supplier console 142, content suppliers may access information collected by service platform 108 relating to its media assets and other associated materials. This information may include content usage information such as the number of times a consumer has viewed its media assets or purchased its products, as well as content distribution and royalty reports. The content supplier may also use supplier console 142 to create or supply business rules for association with one or more media assets supplied. The content supplier may be provided with a user name and a unique password to access the information on service platform 108. Service platform 108 would then only provide information directly related to the media assets of the requesting content supplier. This procedure ensures that each content supplier's information is kept private from other content suppliers. The enterprise software application is preferably installed at the content supplier's location to facilitate the remote communication between the content supplier and platform 108 and may include security enhancements (e.g., encryption) to permit the content supplier to securely transfer media assets for deposit into supply depository 106 and retrieve information from platform 108. The enterprise software application used by supplier console 142 preferably uses a graphic user interface to access platform 108 through private service interface 140.

DESP control console 144 is a software-based device (e.g., a computer) that is operable to run enterprise software adapted to permit the platform operator to configure service platform 108 on a real-time basis. For example, using DESP control console 144, the platform operator may add or modify content users, content supplier business rules, content user services, and perform platform specific configuration (e.g., increase or decrease server allocated resources). In addition, a platform operator may remove a sale item from a particular retail client platform using DESP control console 144, all in real-time. DESP control console 144 may also be used to troubleshoot (or assist in troubleshooting) problems found on service platform 108.

User services console 146 is a software-based device (e.g., computer) that is operable to run enterprise software adapted to permit selected entities (e.g., content user) to manage services, such as billing, marketing, reporting, and support. A selected entity may include a content supplier, client, MSO, network operator, retail site operator or any other content user, entity or person that has a stake or interest in services provided by DESP 100. Using user services console 146, the content user may extract billing information from service platform 108. In addition, the content user can generate marketing and royalty reports for each content supplier, for example, that indicates how the content supplier's media assets have performed on the entertainment service and the amount of royalties due content supplier for use of those media assets. Other stakeholder-related services may also be managed using user services console 146. For example, user services console 146 may generate an interface that allows content suppliers to enter information into defined fields regarding each media asset or group of media assets as already described above in relation to the digital content services function.

The enterprise software application of user services console 146 is preferably installed at the content user's location to facilitate the remote communication between the content user and platform 108 and may include security enhancements (e.g., encryption) to permit the content user to securely retrieve information from platform 108. The enterprise software application used by user services console 146 also preferably uses a graphic user interface to access platform 108 through private service interface 140.

It will be appreciated that private service interface 140 may be adapted to function as a web portal and be operable to generate a graphic user interface accessible from virtually any location without the use of particular enterprise software. Content suppliers and other content users may then retrieve information without being restricted to a particular computer. It will be further appreciated that the functionality of supplier console 142 and user services console 146 may be accessed through a single graphic user interface that may be programmed to offer a "supplier's only" menu option leading to web pages geared only toward content suppliers.

Public service interface 148 is preferably a server-based interface to facilitate communication between service platform 108 and various client platforms 150, for example, cable set top boxes, Internet websites (e.g., low bandwidth and high bandwidth websites), wireless systems (e.g., direct broadcast satellite (DBS)), land-based digital cell phone technology, and any other existing or future system or network capable of delivering digital information. A particular advantage of public service interface 148 is its ability to be programmed to adapt to a variety of client platform interfaces. This feature allows service platform 108 to communicate with each client platform regardless of the communication protocol used by such client platform (e.g., internet protocol). A firewall 152 may be used between service platform 108 and client platforms 150 to prevent unauthorized access to or from service platform 108. Client platforms 150 are preferably used in the Digital Content Sales function of DESP 100 and distribute entertainment services from DESP 100 directly to the consumer.

While service platform 108 provides services and data to client platforms 150, media assets are preferably distributed through a media services platform 154, which is a server-based platform that includes a database 156 for storing media assets. In a preferred embodiment, media platform 154 includes servers that are located in geographical areas close to the consumer to minimize degradation of content quality during delivery. Alternatively, media platform 154 may include servers irrespective of geographic location where broadband quality access is available between the servers and a wide geographic area or region. Media platform 154 communicates with service platform 108 via private interface 140 to send and receive instructions and other information regarding the distribution of media assets to a client. For example, if service platform 108 receives an instruction to stop streaming a certain movie to a particular client and/or consumer from DESP control console 144, that instruction is communicated to media platform 154 and media platform 154 ceases to deliver that movie to that client and/or consumer.

The method of delivery for media platform 154 may be done in a number of known ways, for example, streaming and/or digitally downloading media over a local service provider's broadband network. Media may be streamed, for example, into a portion of the client's graphic user interface, or through the screen of the client's web page. A preferred example of a media delivery system operable with the present invention is taught in U.S. application Ser. No. 09/921,096, titled "Content Distribution System," the disclosure of which is hereby incorporated by reference herein.

Figure 2:
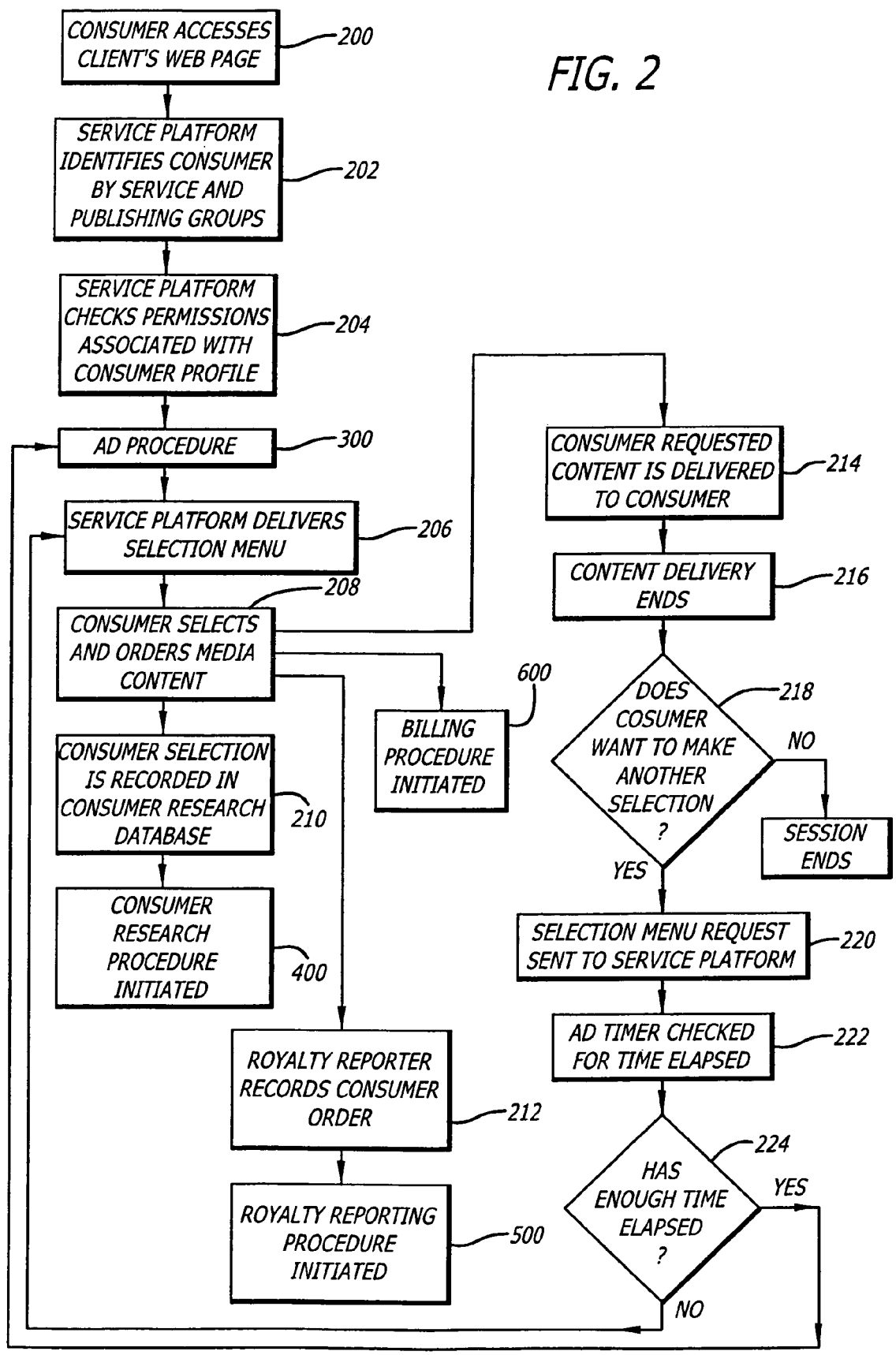
FIG. 2 is a logic diagram of a preferred method for ordering media content.

FIG. 2 shows a preferred method for ordering a media asset on DESP 100. In step 200, a consumer accesses the client's system (e.g., through a web page or cable channel). In step 202, service platform 108 identifies the consumer by service and publishing groups. In step 204, service platform 108 checks the permissions (if any) associated with the consumer profile (e.g., whether the consumer has been authorized by a parent or guardian to view the requested media asset). In a preferred embodiment, an ad procedure is then initiated in step 300.

Figure 3:
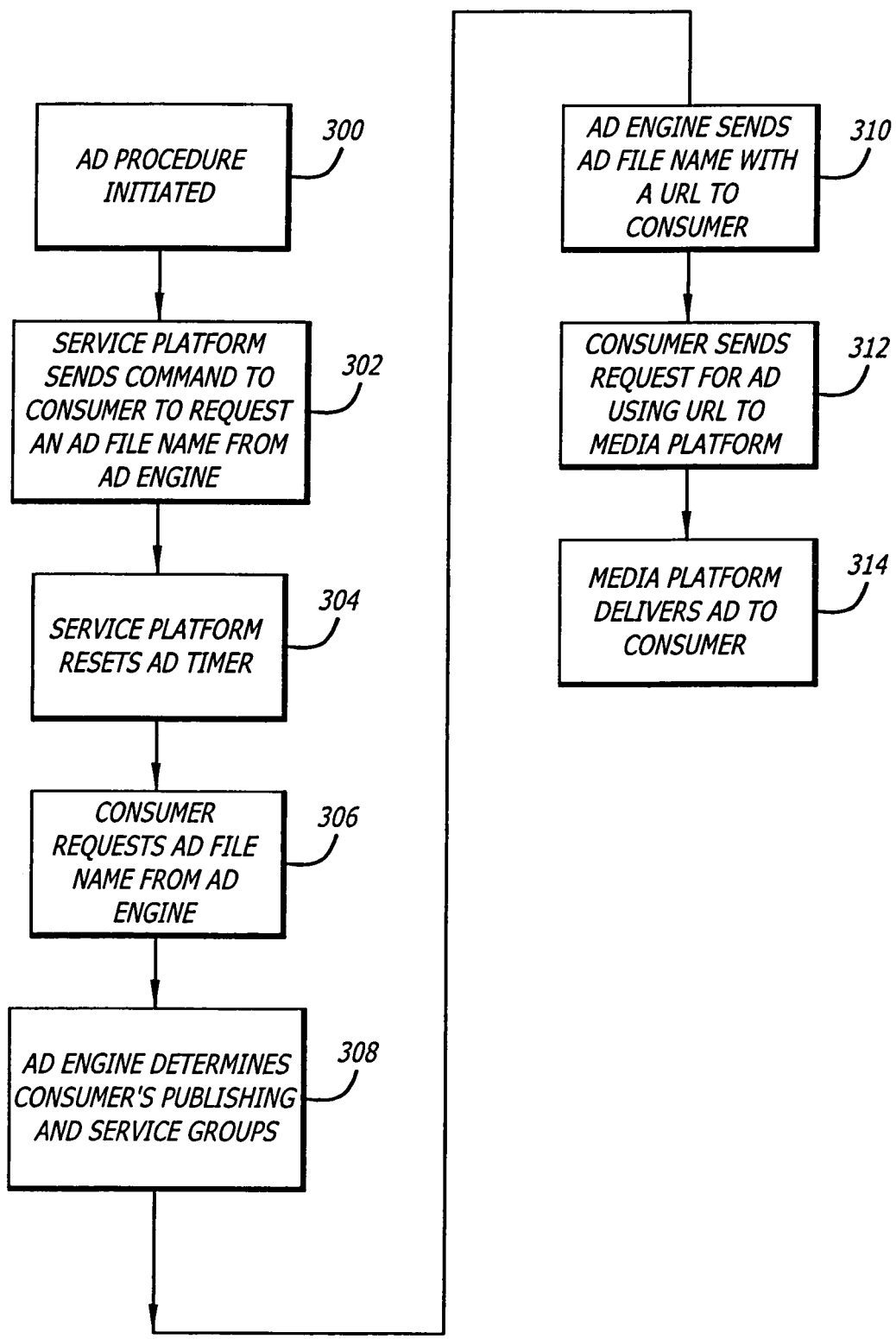
FIG. 3 is a logic diagram of a preferred advertising method for use with the method of FIG. 2.

As shown in FIG. 3, ad procedure 300 is commenced when the consumer or the consumer's visual display (e.g., computer, television set, or other audio-visual device) requests an ad file from ad engine 118 in step 302. The ad engine preferably includes a database of file names of ads to be targeted to specific publishing groups of consumers. In step 304, service platform 108 resets an ad timer, preferably included as part of ad engine 118. The ad timer preferably times consumer interaction rather than a particular content. In step 306, the consumer's visual display requests the ad file name from the ad engine. In step 308, the ad engine determines the consumer's publishing group and service group (e.g., bit rate service requirement) by accessing a database shared by the subscriber management system. In step 310, the ad engine sends the ad file name to the consumer's visual display. Thereafter, the consumer's visual display sends the request for an ad using a universal resource locator (URL) to media platform 154 in step 312. A media server in step 314 delivers the ad to the consumer, thus completing an ad procedure. During the ad procedure, it is understood that one or more steps may be interchanged with others or omitted. For example, step 304, resetting the ad timer, may be accomplished anywhere during the ad procedure.

A preferred example of an ad procedure operable with the present invention is taught in U.S. application Ser. No. 09/825,758, titled "Internet-Protocol Based Interstitial Advertising," the disclosure of which is hereby incorporated by reference herein. It will be appreciated, however, that ad procedure 300 may be initiated at more than one location in the order of the method, or omitted altogether.

As shown in FIG. 2, service platform 108 delivers a selection menu to the consumer in step 206. In step 208, the consumer selects and orders the media content desired. At this point, a number of events may simultaneously occur. In step 210, the consumer selection is recorded in a consumer research database, which may be located on service platform 108. Thereafter, a consumer research procedure may be initiated in step 400.

Figure 4:
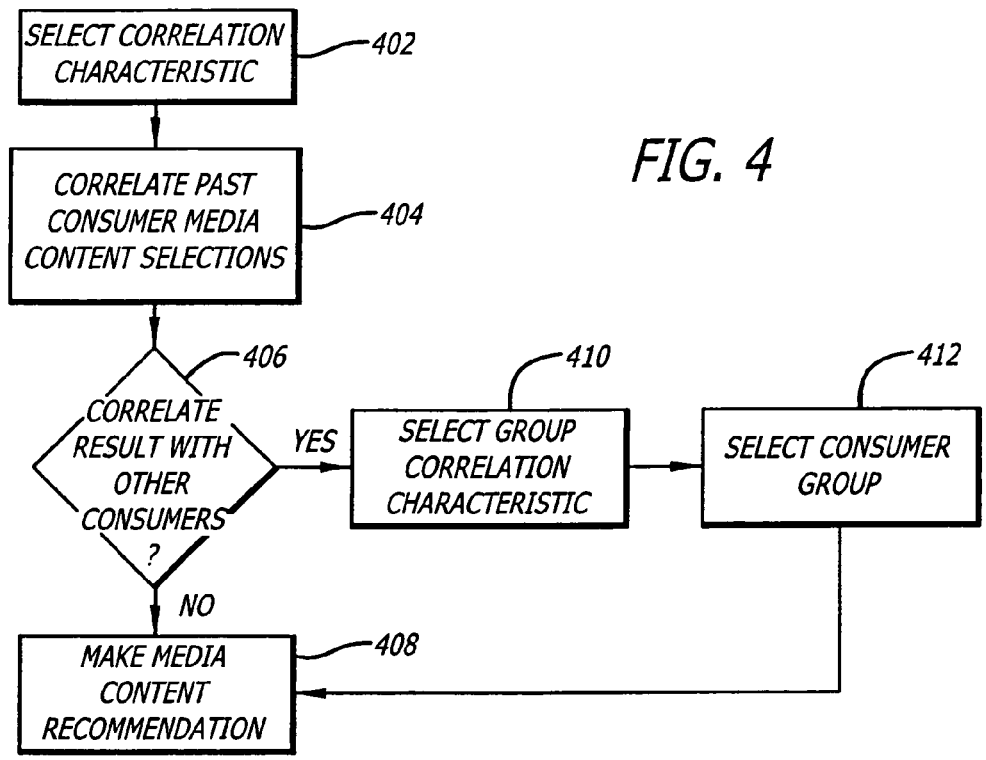
FIG. 4 is a logic diagram of a preferred method of making content recommendations to a consumer for use with the method of FIG. 2.

As shown in FIG. 4, a consumer research procedure may be commenced by any content user to provide information related to the past media content usage of the consumer and make recommendations for additional media content appealing to the consumer. In step 402, a correlation characteristic is selected. Exemplary correlation characteristics may include, though not limited to, media content category or sub-category (e.g., media assets such as movies and audio programs), genre (e.g., romance, adventure), consumer demographics, consumer content usage, parental controls, and geographic location (consumer or provider). In step 404, the past consumer media content selections are correlated based on the correlation characteristic. For example, if a content supplier desires to obtain information regarding a particular consumer's preference among movies and movie actors, correlation characteristics of movies (type) and movie actors may be used to produce a report showing the consumer's preference for science fiction films starring R2D2. This information may be used to target ads or similar films having the same actor to the consumer.

In step 406, an option is provided to correlate the result obtained from step 404 with other consumers. If no further correlations are desired, then the results obtained from step 404 are used to make media content recommendations to the consumer in step 408, preferably as the consumer is selecting media content. Content selections may also be made to content users in addition to or in place of any made to the consumer. If it is desired to correlate the result from step 404 with other consumers, then a group selection correlation characteristic may be selected in step 410. Exemplary group correlation characteristics may include any one or a combination of the characteristics described for use as a correlation characteristic above and applicable to a group of consumers. In step 412, a consumer group is selected. Consumers may be grouped, for example, based on parameters associated with service and publishing groups. A correlation among a particular consumer group may yield information that can be used to target ads and/or other media assets to a group of consumers rather than an individual consumer.

As will be appreciated by those skilled in the art, the above steps need not be performed in the described order. Various steps may be re-ordered or omitted, or new steps added. For example, steps 410 and 412 may be performed without first obtaining a correlation of past consumer media content selections, thereby bypassing steps 402 and 404 altogether. Also, step 408 may be omitted if only a research report is desired.

As shown in FIG. 2, in step 212, service platform 108 records a request or order of the consumer for media assets from DESP 100. Thereafter, in step 500, a royalty reporting procedure is initiated on service platform 108 to track the royalties due to content suppliers for the media assets used by the consumer.

Figure 5:
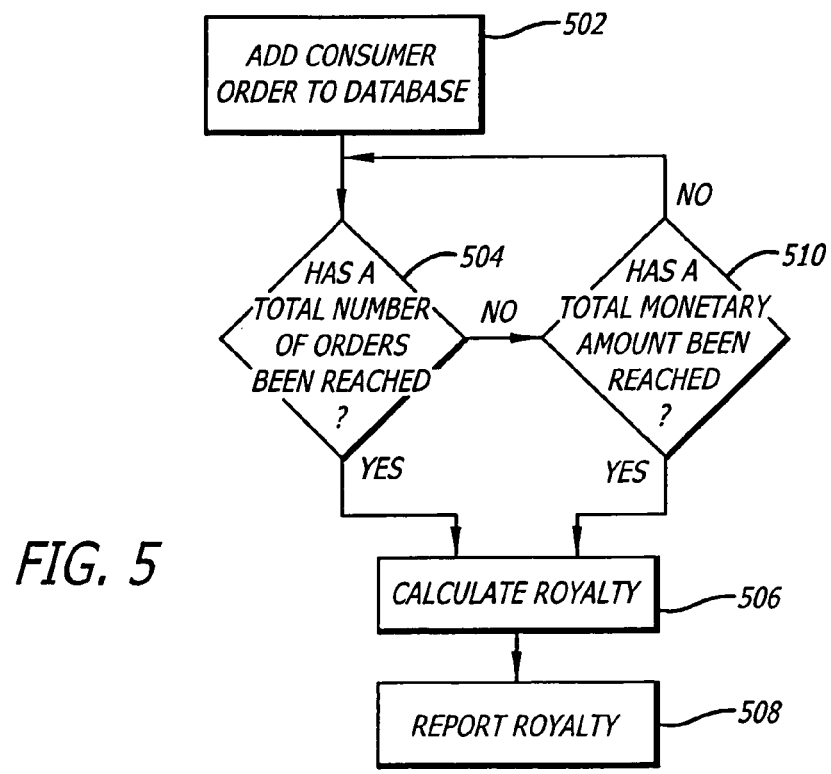
FIG. 5 is a logic diagram of a preferred method of reporting royalties for use with the method of FIG. 2.

As shown in FIG. 5, the consumer order for particular media asset(s) is added to a database adapted to keep a record of orders for media assets in step 502. In step 504, it is determined whether a total number of orders for a particular media asset have reached a selected number. If the total number of orders has reached the selected number, then the amount due to the content supplier for use of the media asset may be calculated in step 506 and included in a report to a content supplier or owner in step 508. For example, a processor may be programmed to calculate and report an amount due to a content supplier based on a royalty for a particular media asset once one hundred orders have been received for that media asset. If the total number of orders has not been reached for the particular media asset, then it is determined whether a specified total monetary amount has been reached in step 510. If the specified total monetary amount has been reached, then steps 506 and 508 are performed. If the specified total monetary amount has not been reached, then steps 504 and 510 are repeated until one of the determinations results in the condition being satisfied.

As will be appreciated by those skilled in the art, the above steps need not be performed in the described order. Various steps may be re-ordered or omitted, or new steps added. For example, steps 504 and 510 may be reversed in order. Alternatively, either step 504 or step 510 may be omitted. Also, either or both of steps 504 and 510 may be based on a media content offering rather than an individual media asset. Therefore, a content supplier or owner may receive royalties based on the total orders and/or total monetary amount associated with their media asset portfolio used by system 100. Another decision step may be added to or replace either or both of steps 504 and 510 to calculate and report royalties based on an interval of time elapsing. For example, royalties for a particular media asset may be reported on a monthly basis to the media content supplier or owner.

Figure 6:
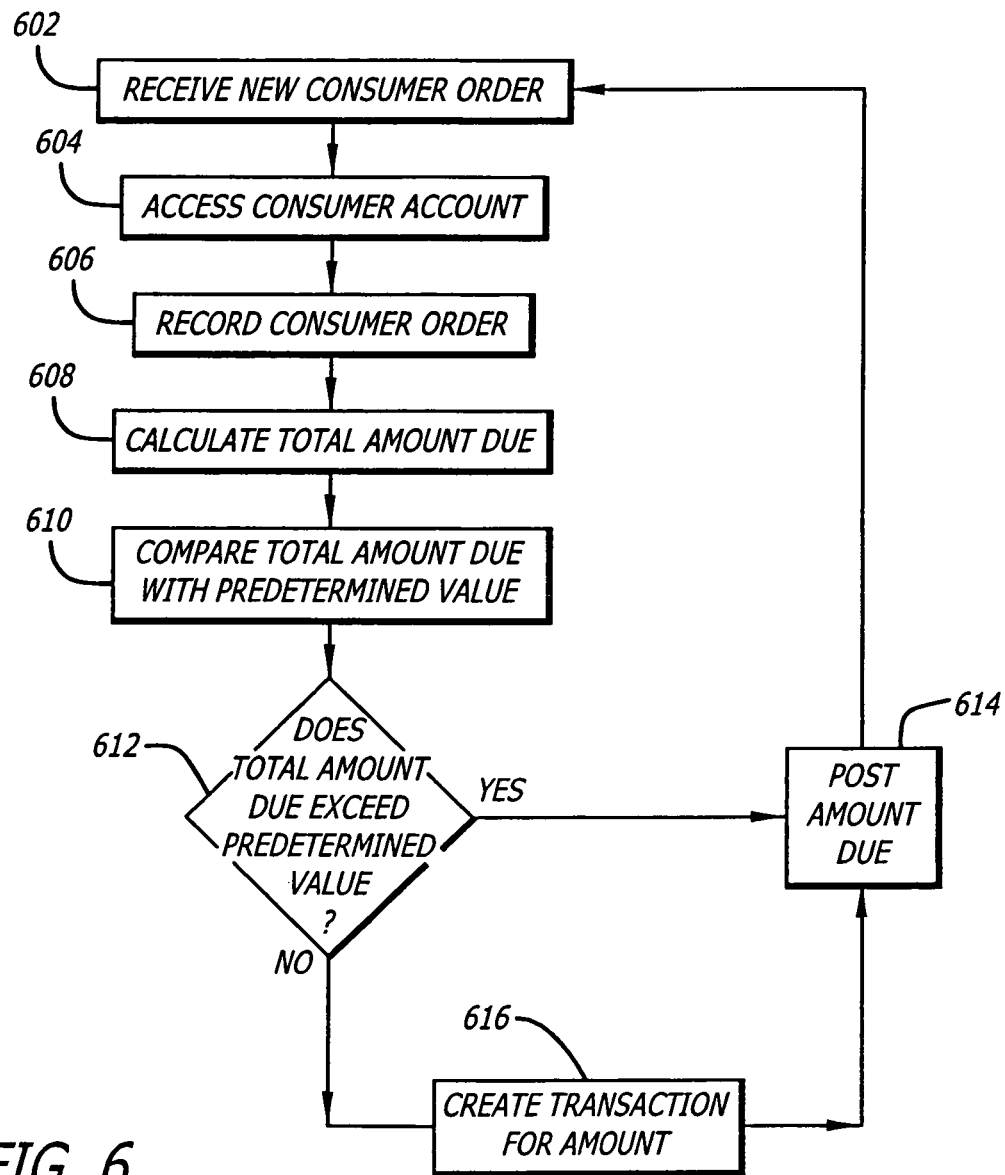
FIG. 6 is a logic diagram of a preferred method for posting an amount due for a consumer account.

As shown in FIG. 2, step 600, a billing procedure is initiated on service platform 108 to charge the consumer's account for any purchases made during their use of the entertainment service provided by DESP 100 (e.g., movie or DVD purchase). As shown in FIG. 6, in step 602, a new consumer order is received. In step 604, the consumer account is accessed. In step 606, the consumer order is recorded. In step 608, the system calculates the total amount due on the consumer account. In step 610, the total amount due is compared with a predetermined value. If the total amount due exceeds the predetermined value in step 612, then the amount due is posted in step 614 using the consumer's pre-selected form of payment, for example, a credit card. In addition, accounts may have a billing cycle. If the total amount due has not reached the predetermined spending limit set by the account holder in a predetermined time frame (e.g., end of the billing cycle) then a transaction is created in step 616 for that amount and the amount due is posted using the consumer's pre-selected form of payment in step 614. For example, the preferred billing procedure of the present invention may post a consumer's total amount due to a credit card if the amount due exceeds $30.00, or if the account has gone more than 30 days without a bill posting.

As will be appreciated by those skilled in the art, the above steps need not be performed in the described order. Various steps may be re-ordered or omitted, or new steps added. For example, a consumer's order may be recorded and billing determinations made before delivery of the consumer order. Alternatively, the consumer may be charged at the point of sale for each purchase made on the service. One skilled in the art will appreciate that there are many commercially known billing procedures that could be used to obtain payment for consumer purchases.

As shown in FIG. 2, in step 214, the consumer-requested content is electronically delivered to the consumer (e.g., using streaming or digital download technology). It should be noted that, while it is preferred that steps 210, 212, 600 and 214, occur simultaneously, these steps may differ in order and timing without departing from the broad scope of the present invention. In step 216, the content delivery ends and the consumer is presented with a decision whether to make another selection in step 218. If the consumer decides not to make another selection, then the session ends. If the consumer decides to make another selection, a selection menu request is sent to service platform 108 in step 220. Next, the ad timer is checked for time elapsed in step 222. At this point, the decision is made whether enough time has elapsed after checking the ad timer by comparing a predetermined time before initiating another ad procedure against the time reported on the ad timer in step 224. If enough time has not elapsed, then service platform 108 delivers a selection menu to the consumer. If, however, enough time has elapsed, then another ad procedure is initiated. It should be understood, however, that an ad procedure is only preferred and not necessary to this method. For example, it is possible that a client or other content user may have their own ad procedure that they wish to incorporate within their system. The present invention, however, gives the client or other content user the option to use an ad procedure integrated with content delivery.

Alternatively, media assets may be offered to the consumer as part of a subscription package, advertising supported package, or other manner based on the preferences of the content supplier and/or client. Service platform 108 may be configured to support one or more business models or other criteria for generating revenue from the media assets.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for managing and marketing digital media content supplied by media content suppliers to consumers, the method comprising:
    providing the media content suppliers direct access to a digital media content service platform for permitting the media content suppliers to supply video content to the digital media content service platform by electronic transmission;
    storing the video content supplied by the media content suppliers on the digital media content service platform;
    combining the video content with metadata to create a media content offering for use by the consumers;
    including advertising information with the video content and the metadata of the media content offering, the advertising information associating at least one advertisement with the video content;
    permitting the media content suppliers to supply business rules to the digital media content service platform, at least one of the business rules governing distribution of the video content to a specified geographic location;
    offering the media content offering to the consumers in accordance with the business rules supplied by the media content suppliers to deliver the video content over at least two different client platforms including a set top box and a wireless cellular phone, the media content offering being associated with a localized market, the offering of the media content offering to the consumers including determining whether a consumer making a request for a selected media content offering is permitted to use the selected media content offering, and issuing a license to the consumer making the request upon a determination that the consumer is permitted to use the selected media content offering;
    grouping the consumers into a grouping of consumers according to a geographic location shared by the consumers; and
    delivering the media content offering associated with the localized market to the grouping of consumers if the shared geographic location corresponds to the specified geographic location in the at least one of the business rules.

2. The method of claim 1, wherein offering the media content offering to the consumers includes offering a consumer good to the consumers.

3. The method of claim 1, wherein the license issued expires after a selected interval of time.

4. A method for managing and marketing digital media content supplied by media content suppliers to consumers, the method comprising:
    providing a digital media content service platform operable to manage and distribute video content to a plurality of the consumers in accordance with business rules supplied by the media content suppliers, wherein distribution to geographic locations is one of the business rules supplied by the media content suppliers;
    providing the media content suppliers access to the digital media content service platform for permitting the media content suppliers to directly supply the video content to the digital media content service platform by electronic transmission;
    storing the video content supplied by the media content suppliers on the digital media content service platform;
    including coded information with the video content, the coded information being advertising information associating at least one advertisement with the video content;
    specifying at least one of the business rules for distributing the stored video content to a specified geographic location;
    grouping the consumers by a geographic location associated with the consumers;
    distributing the video content to the grouping of consumers if the geographic location of the consumers corresponds to the specified geographic location in the at least one of the business rules;
    offering the video content over at least two different client platforms, including a set top box and a wireless cellular phone, to the grouping of consumers, determining whether a consumer making a request for selected video content is permitted to use the selected video content, and issuing a license to the consumer making a request upon a determination that the consumer is permitted to use the selected video content; and
    distributing targeted advertising with the video content to the grouping of consumers, the targeted advertising being targeted to the grouping of consumers based on the geographic location of the consumers.

5. The method of claim 4, further comprising associating metadata with the video content supplied by at least one of the media content suppliers.

6. The method of claim 4, wherein the license issued expires after a selected interval of time.

7. The method of claim 1, further comprising targeting advertising to the localized market, and presenting the advertising to the grouping of consumers, if the shared geographical location corresponds to the localized market.

8. The method of claim 1, further comprising associating consumer goods with the media content offering, and offering the consumer goods to the grouping of consumers.

9. The method of claim 8, further comprising embedding purchasing opportunities for the consumer goods within the media content offering.

10. The method of claim 1, further comprising providing recommendations to the grouping of consumers for additional media content offerings based on video content usage information associated with the shared geographic location.

11. The method of claim 4, further comprising associating consumer goods with the video content, and offering the consumer goods to the consumers.

12. The method of claim 11, further comprising embedding purchasing opportunities for the consumer goods within the video content.

13. A method for managing and marketing digital media content supplied by media content suppliers to consumers, the method comprising:

provided a digital media content service platform operable to manage and distribute video content to a plurality of the consumers in accordance with business rules supplied by the media content suppliers, wherein distribution to geographic locations is one of the business rules supplied by the media content suppliers;

providing the media content suppliers access to the digital media content service platform for permitting the media content suppliers to directly supply the video content to the digital media content service platform by electronic transmission;

storing the video content supplied by the media content suppliers on the digital media content service platform;

including coded information with the video content, the coded information being advertising information associating at least one advertisement with the video content;

specifying at least one of the business rules for distributing the video content to a specified geographic location;

grouping the consumers by a geographic location associated with the consumers;

embedding purchasing opportunities for merchandise with the video content, the merchandise being other than the video content supplied to the digital media content service platform and purchasable by the consumer interacting with the embedded purchasing opportunities;

distributing the video content to the grouping of consumers if the geographic location of the consumers corresponds to the specified geographic location in the at least one of the business rules, wherein the video content being distributed corresponds to a localized market for the grouping of consumers; and offering the merchandise to the consumers for purchase via the embedded purchasing opportunities.

14. The method of claim 13, further comprising distributing advertising targeted to the localized market for the grouping of consumers.

15. The method of claim 13, further comprising providing recommendations to the consumers for additional video content based on video content usage information associated with the geographic location of the consumers.

16. The method of claim 1, wherein the media content offering is offered only to consumers of a media content subscription service.

17. The method of claim 4, wherein the video content is offered only to consumers of a media content subscription service.

18. The method of claim 13, wherein the video content is offered only to consumers of a media content subscription service.

* * * * *

UNITED STATES PATENT AND TRADEMARK OFFICE
CERTIFICATE OF CORRECTION

PATENT NO. : 8,468,099 B2  
APPLICATION NO. : 12/587667  
DATED : June 18, 2013  
INVENTOR(S) : Kevin P. Headings et al.

Page 1 of 1

It is certified that error appears in the above-identified patent and that said Letters Patent is hereby corrected as shown below:

Title Page 4, Item (56), Other Publications:
Column 1, line 22: change "www.mp3.com/Artist/artisffaq.php3" to
--www.mp3.com/Artist/artistfaq.php3--;
Column 1, line 30: change "theinternet" to –the internet–;
Column 1, line 49: change "wstreamingmedia.com/article.asp?id=5025&page=1" to
--w.streamingmedia.com/article.asp?id=5025&page=1--;

Column 2, line 10: change "19991013120103/http://www.mp3,com;" to
--19991013120103/http://www.mp3.com--;
Column 2, line 21: change "Owner's, Amendment" to --Owner's Amendment--;
Column 2, line 43: change "et al," to --et al.,--; and
Column 2, lines 53 and 57: change "Vo." to --Vol.--.

Title Page 5, Item (56), Other Publications:
Column 1, line 26: change "Documents." to --Documents,--;
Column 1, line 30: change "Fugure" to --Future--;
Column 2, line 22: change "amd" to --and--; and
Column 2, line 23: change "Mulimedia" to --Multimedia--.

Signed and Sealed this  
Twenty-second Day of October, 2013

Teresa Stanek Rea  
*Deputy Director of the United States Patent and Trademark Office*